May 13, 1952  C. P. LEESE  2,596,777
LATERAL MOTION TRUCK
Filed Oct. 4, 1946  2 SHEETS—SHEET 1
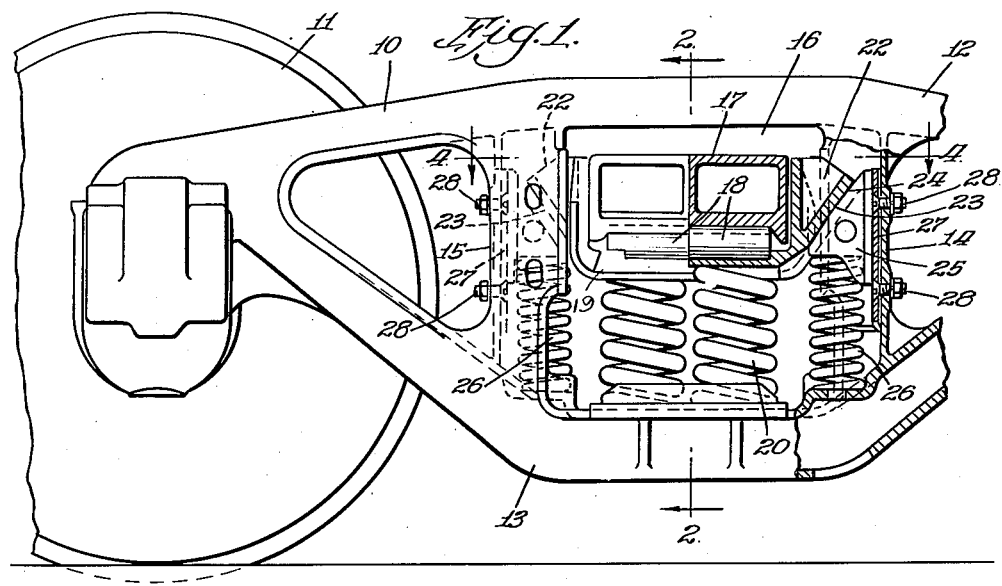
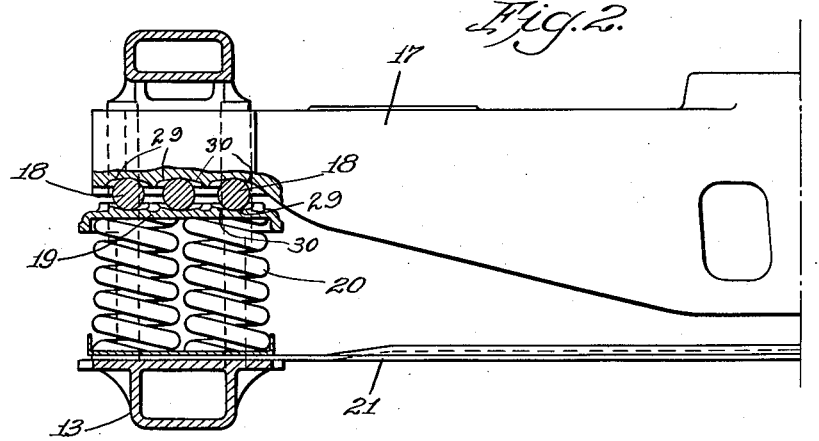
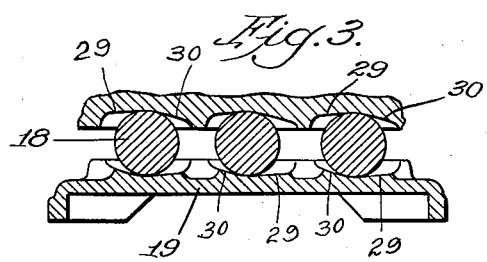
INVENTOR.
Charles P. Leese
BY
Harvey M. Gillespie
Atty.

INVENTOR.
Charles P. Leese
BY
Harvey M. Gillespie
Atty.

Patented May 13, 1952

2,596,777

UNITED STATES PATENT OFFICE 2,596,777

LATERAL MOTION TRUCK

Charles P. Leese, Chicago, Ill., assignor to Standard Car Truck Company, Chicago, Ill., a corporation of New Jersey Application October 4, 1946, Serial No. 701,388

5 Claims. (Cl. 105—186)

1

This invention relates to improvements in lateral motion trucks for railway cars and, particularly, to trucks of the general class in which the opposite ends of a truck bolster are supported on roller elements which permit the bolster to move transversely of the truck side frames.

In trucks of the above general class, the roller elements are interposed between upper and lower bearing surfaces which are provided with contours of such configuration that one end of the truck bolster is elevated relative to the other end when the bolster is moved, from its normally centralized position, in a direction outwardly relative to either side frames of the truck. The purpose of the upward and outward movement of the bolster is to shift the bolster and the car body supported thereon to suitable angular positions to minimize lateral swaying of the car when it is in motion.

In some truck constructions of the general class to which the present invention appertains, the bearing surfaces engaged by the roller elements are formed integrally in the bottom faces of the truck bolster at opposite ends thereof and cooperate with lower surfaces of like contour formed on separate castings, which castings are removably mounted in the truck side frames at opposite sides of the truck.

In other constructions, both upper and lower bearing surfaces for the rollers are formed in separate plates of identical construction. However, in both of the general constructions above referred to, the removable elements which contain the bearing surfaces for the rollers are so positioned that the curved surfaces underlying the roller elements will be properly positioned relative to the correspondingly curved surfaces which overlie the roller elements. Inasmuch as the roller bearing surfaces are preferably unsymmetrical, the plates or casting elements in which the bearing surfaces are formed are applied in reverse relation to each other so as to arrange the corresponding contours of the bearing surfaces in their proper position relative to the roller members.

The principal object of the invention is to provide, for trucks of the above general class, roller bearing seat elements which may be made of identical construction so as to permit them to be applied at any location where such bearing seat is required, but which are so formed as to cooperate with special constructions of associated parts of the truck to prevent improper application of the bearing seat elements regardless of the location in which they are used.

The invention includes, as a further object, the provision of new and improved arrangements, constructions, and combination of parts hereinafter described and claimed for carrying out the above stated object and such other specific objects as will appear from the following disclosure.

The invention is illustrated in certain preferred embodiments in the accompanying drawings herein:

Fig. 1 is a fragmentary side view, partly in section, of one of the side frames of a railway car truck and illustrating a removable bearing seat casting constructed in accordance with this invention.

Fig. 2 is a vertical section taken on line 2—2 of Fig. 1, but illustrates only one-half of the truck and omits the wheels and axles thereof.

Fig. 3 is a fragmentary sectional view of the roller elements and the bearing surfaces engaged thereby, this view being shown on a larger scale than that indicated in Fig. 2, so as to better illustrate the unsymmetrical contours of the roller engaging surfaces.

Fig. 5 is a fragmentary sectional view similar to Fig. 2, illustrating a different form of truck construction and roller bearing seat elements of modified constructions.

Figure 4:
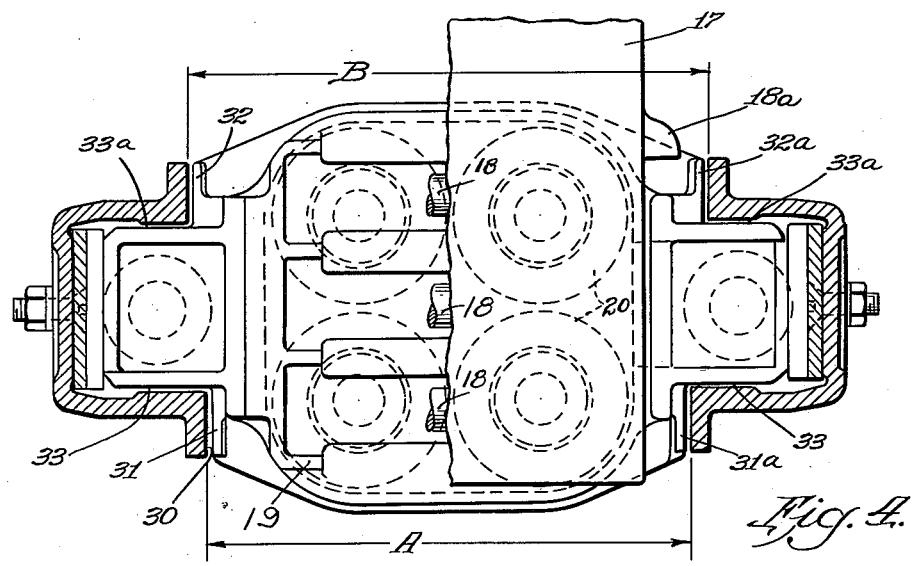

Referring first to Figs. 1 to 4, inclusive, of the drawings: One side frame member of the truck is designated by reference numeral 10. Only one side frame member is illustrated, but it will be understood that a complete truck comprises two side frame members of corresponding structure and four wheels 11 on which the side frames are supported.

Each side frame member includes an upper compression member 12 and a lower tension member 13, which are connected near the middle of the frame by vertically extending columns 14 and 15. The said columns are preferably channel-shape in cross section and define the side walls of a bolster window 16 through which an end portion of the bolster 17 extends. Each end of the bolster is supported on a plurality of roller elements 18 which are interposed between the bottom surfaces of the bolster and a roller bearing seat element 19. The said element 19 is removably positioned in the channel portions of the vertical columns 14 and 15 and is supported on a group of load supporting springs 20, which are interposed between the element 19 and the tension member 13 of the truck side frame. In the present illustration and the said springs 20 seat on the top surface of a spring plank 21 so as to hold it engaged with the side frame members. The spring plank engages the lower tension members of the side frames at opposite sides of the truck to hold the frames in their properly spaced relation.

Each roller bearing seat element 19 is formed at opposite sides with laterally extending lugs 22—22, which extend into the channel portions of the columns 14 and 15 so that the inboard and outboard vertical faces of the lugs will engage the inboard and outboard flanges of said columns to retain the element 19 in the side frame. Each lug 22 is provided with an upwardly inclined bearing surface 23 for engaging a correspondingly inclined face 24 of a wedge member 25. The said wedge member is located in the channel portion of the said column in a position to be engaged by one of said lugs 22. Springs 26—26 are positioned to bear against the lower ends of the wedges 25, so as to force the inclined surfaces 24 of the wedges against the inclined faces of the lug 22 and thereby force the wedge members into increasing frictional engagement with the vertical inner faces of the columns 14 and 15. The inner faces of the said columns 14 and 15 are preferably provided with removable wear plates 27, which may be secured in position in any suitable manner; for example, by means of bolts 28.

The bearing surfaces which engage the upper and lower portions of the roller elements 18 each include a flat but inclined surface 29 and a curved surface 30 (see Fig. 3) which are joined together by an arc having a radius slightly greater than that of the roller. The curved surface 30 is preferably such that it provides a greater inclination than the surface 29. In view of the unsymmetrical contour of the roller bearing surfaces, and the fact that the rollers at one side of the truck engage the curved surfaces 30, during a lengthwise movement of the bolster, while the rollers at the other side of the truck engage the surfaces 29, it is important that the surfaces engaging the top of the rollers and the surfaces engaging the bottom of the rollers be of corresponding contour and positioned at opposite sides of the vertical axes of their associated roller.

The purpose of the present invention is to provide improved structure, both in the side frames and in the roller bearing seat elements which will insure the proper positioning of the roller bearing seat elements in the truck side frames.

In order to obtain the above result in the structure of Figs. 1 to 4 inclusive, the window opening in the truck side frame 10 is made somewhat less in width at the outer face of the side frame than at the inner face thereof, that is to say, the dimension A (Fig. 4) is less than dimension B. Also, the vertical flanges 31—31a at the outer edge of the roller seat element 19 (Fig. 4) is spaced apart a distance less than the corresponding vertical flanges 32—32a at the inner edge of said roller seat element. It will be seen, therefore, that the roller seat element 19 can be applied in the side frame of a truck only in the position indicated in the drawing. Consequently, when it is installed in the truck side frames at opposite sides of the truck, the unsymmetrical roller engaging surfaces of the element 19 at one side of the truck will be in proper relation to the roller engaging surfaces at the other side of the truck. The end portions of the bolster 17 are provided at opposite sides with abutment lugs 18a, adapted to abut against portions of the bearing member 19 to limit the outward movements of the bolster relative to a side frame.

Figure 5:
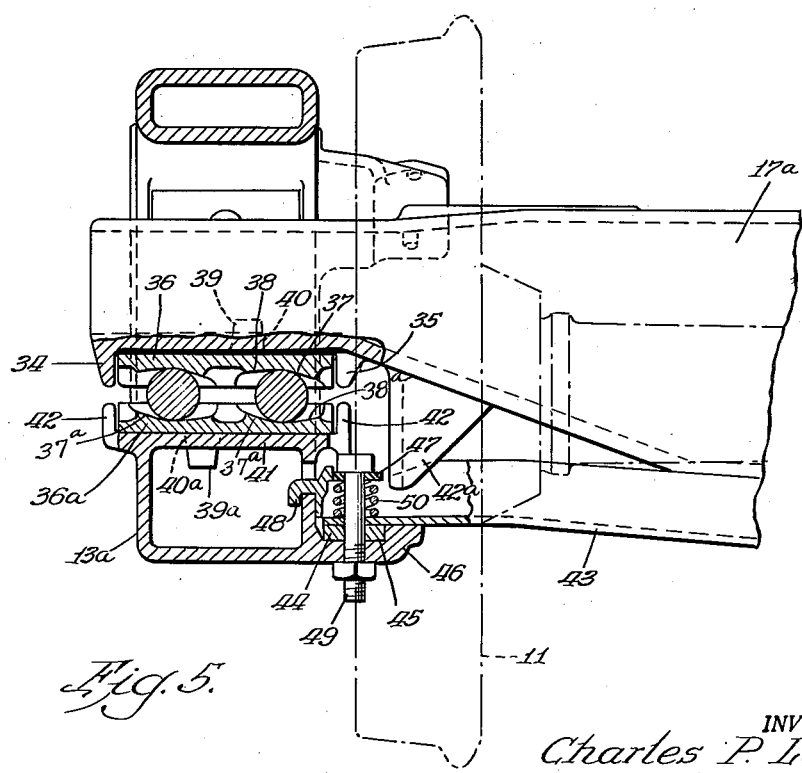
Fig. 5 is a fragmentary sectional view taken substantially on line 4—4 of Fig. 1, showing one-half of the bolster broken away so as to expose to view the top face of the roller bearing seat.

Referring now to the modified construction shown in Fig. 5 of the drawing: The opposite ends of the bolster member designated 17a is provided with outboard and inboard depending lugs 34 and 35 between which a roller bearing seat plate 36 is removably positioned, the outboard and inboard vertical faces of the plate being engaged by the outboard and inboard lugs, respectively. The contours of the roller engaging surfaces 37—38 of this plate may or may not be the same as the contours indicated in the preceding figures but they are not symmetrical. The top surface of the plate 36 is formed with an integral stud 39, located at one side of the center of the plate and fits into an opening formed in the bottom web of the bolster. A bottom bearing member seat plate 36a has construction identical to the said plate 36 and is seated on the top web 41 of the tension member 13a of the truck side frame. The outboard and inboard edges of this web are formed with upstanding lugs 42—42, similar to the lugs 34 and 35, and function as retaining elements for the bearing seat plate 36a to prevent lateral movement thereof. In order to insure the proper installation of the member 36a, its stud designated 39a extends through the opening 40a in the truck side frame and is positioned so that the short end of the bearing seat plate 36a must be arranged adjacent the outer face of the side frame, whereas the opening 40 in the truck bolster is positioned so that the short end of the bearing seat plate 36 must be arranged adjacent the inner face of the side frame.

The bolster is formed on its bottom surface with one or more depending abutment lugs 42a, adapted to engage the inner face of the truck side frame to limit the transverse movement of the truck bolster.

The tension members 13a of the side frames at opposite sides of the truck are connected together by means of a spring plank structure 43, comprising a channel member. Each end of the channel is provided with a cleat 44 adapted to fit into a recess 45 formed in an inwardly extending flange 46 on the side frame. The said cleat fits within the recess 45 with sufficient looseness to permit the side frames to move vertically with relation to each other.

The spring plank structure is held in its interlocked engagement with each side frame by means of a bracket 47 formed at one end with a hook portion 48. The said hook extends through an opening in the side frame and engages a web portion of the side frame. The bracket 47 is held in position by means of bolt 49 which extends through the bracket and through the flange 46 of the side frame. A coil spring 50 is interposed between the said bracket 47 and the top surface of the spring plank so that the said plank is held yieldably in its applied position.

The spring plank structure herein described corresponds substantially to the structure described and claimed in my co-pending application, Serial No. 616,238, filed September 14, 1945. This structure, therefore, is not claimed per se in the present application.

While two specific embodiments of the invention are disclosed herein it will be obvious to persons familiar with the railway truck art that the principles of the invention may be applied to lateral motion trucks of other construction. It will be understood, therefore, that the invention is not to be limited to the structure shown and described herein except as to the structure specified in the claims.

I claim:

1. In a car truck having a bolster supported for movement transversely of the truck, the combination of a side frame formed with a window in which the bolster is movably supported, a roller bearing seat member removably mounted in the window of said frame and having, in its operative position, upwardly facing concave bearing seats, roller elements supported in said concave bearing seats to support the bolster, means including a part of the frame at one side of the longitudinal center vertical plane thereof defining an outboard surface on the frame, means including a part of the frame at the other side of said longitudinal center vertical plane defining an inboard surface on the frame, means defining outboard and inboard surfaces on the seat member engaging said outboard and inboard surfaces of the frame to retain the seat member in position in said window, and means located on the bearing seat member at opposite sides of a vertical center plane thereof for engaging portions of the frame at opposite sides of said longitudinal center plane for limiting the application of the bearing seat member to a predetermined operative arrangement within said window.

2. In a car truck having a bolster supported for movement transversely of the truck, the combination of a side frame having a pair of vertically disposed channel columns arranged with their open sides facing each other and having spaced apart outer and inner flanges of different widths defining opposite side faces of said columns and also defining the side limits of a bolster window whose width adjacent the outer side of the frame is less than its width adjacent the inner side of the frame, a roller bearing seat member provided with upwardly facing roller bearing seats thereon and provided also with lugs adapted to be positioned in the channel portions of said columns to maintain said roller bearing seat member in position within said window with capacity for vertical movement relative to the side frame, means overlying said roller bearing seat member and provided with downwardly facing roller bearing seats arranged in predetermined relation to said upwardly facing bearing seats, and roller bearings positioned between said upwardly and downwardly facing seats; the said roller bearing seat member being formed with side faces engaging the inner limits of the flanges of said channel columns and being spaced apart less distance adjacent the narrower portion of the window than at the wider portion thereof, whereby the respective widths between the side faces of said roller bearing seat member and the different widths of the window cooperate to limit the application of said roller bearing seat member to a predetermined arrangement in the window.

3. In a car truck having a bolster supported for movement transversely of the truck, the combination of a side frame having a pair of vertically disposed channel columns arranged with their open sides facing each other and having spaced apart outer and inner flanges of different widths defining opposite side faces of said columns and also defining the side limits of a bolster window whose width adjacent the outer side of the frame is less than its width adjacent the inner side of the frame, a roller bearing seat member provided with upwardly facing roller bearing seats thereon and provided also with lugs adapted to be positioned in the channel portions of said columns to maintain said roller bearing seat member in position within said window with capacity for vertical movement relative to the side frame, means overlying said roller bearing seat member and provided with downwardly facing roller bearing seats arranged in predetermined relation to said upwardly facing bearing seats, roller bearings positioned between said upwardly and downwardly facing seats, and resilient means on which the said roller bearing seat member is supported; the said roller bearing seat member being formed with portions embracing opposite vertical side faces of the bolster and with vertical bearing surfaces engaging the inner limits of the flanges of said columns and the distance between said vertical bearing surfaces adjacent the narrower portion of the window being less than the distance between the said vertical bearing surfaces at the wider portion of the window, whereby the respective widths between the vertical bearing surfaces of said roller bearing seat member and the different widths of the window cooperate to limit the application of said roller bearing seat member to a predetermined arrangement in the window.

4. In a car truck having a bolster supported for movement transversely of the truck, the combination with a side frame having a pair of vertically disposed channel columns arranged with their open sides facing each other and having spaced apart outer and inner flanges of different widths defining opposite side faces of said columns and also defining the side limits of a bolster window whose width adjacent the outer side of the frame is less than its width adjacent the inner side of the frame, a roller bearing seat member provided with upwardly facing roller bearing seats thereon and provided also with lugs adapted to be positioned in the channel portions of said columns to maintain said roller bearing seat member in position within the window with capacity for vertical movement relative to said frame and formed with bottom faces which incline upwardly lengthwise of the frame, means overlying said roller bearing seat member and provided with downwardly facing roller bearing seats arranged in predetermined relation to said upwardly facing bearing seats, roller bearings positioned between said upwardly and downwardly facing seats, resilient means on which the roller bearing seat member is supported, comprising load springs positioned beneath the roller bearing seat member and resting on a portion of the side frame, friction wedges positioned in said channel columns beneath the inclined bottom surface of said lugs, and springs in said channel columns for supporting said wedges; the said roller bearing seat member being formed with side portions embracing opposite vertical side faces of the bolster and with vertical bearing surfaces engaging the inner limits of the flanges of said columns and the distance between the said vertical bearing surfaces adjacent the narrower portion of the window being less than the distance between the said vertical bearing surfaces at the wider portion of the window, whereby the respective widths between the vertical bearing surfaces of said roller bearing seat member and the different widths of the window cooperate to limit the application of said roller bearing seat member to a predetermined arrangement in the window.

5. In a car truck having a bolster supported for movement transversely of the truck, the combination of a side frame formed with a window in which the bolster is movably supported, a pair of identical bearing seat members formed with roller bearing seats therein and removably mounted in the window of said frame, roller elements interposed between said bearing seat members to support the bolster, means formed on the frame and engaging inboard and outboard faces of one bearing seat member to hold it in position, means formed on the bolster for retaining the other bearing seat member in position, a stud formed on one of the bearing seat members and engaging portions of the frame and a stud formed on the other bearing seat member and engaging portions of the bolster for limiting the application of said bearing seat members to a predetermined arrangement relative to each other.

CHARLES P. LEESE.

REFERENCES CITED

The following references are of record in the file of this patent:

UNITED STATES PATENTS

| Number | Name | Date |
| --- | --- | --- |
| 819,480 | Westlake | May 1, 1906 |
| 1,007,686 | Gerber | Nov. 7, 1911 |
| 1,176,938 | Webb | Mar. 28, 1916 |
| 1,316,553 | Barber | Sept. 23, 1919 |
| 1,907,505 | Clasen | May 9, 1933 |
| 1,946,538 | Martin | Feb. 13, 1934 |
| 2,116,496 | Casey | May 10, 1938 |
| 2,118,006 | Couch | May 17, 1938 |
| 2,346,860 | Mohl | Apr. 18, 1944 |